INVENTOR.
FRANCIS P. EDWARDS

ATTORNEY

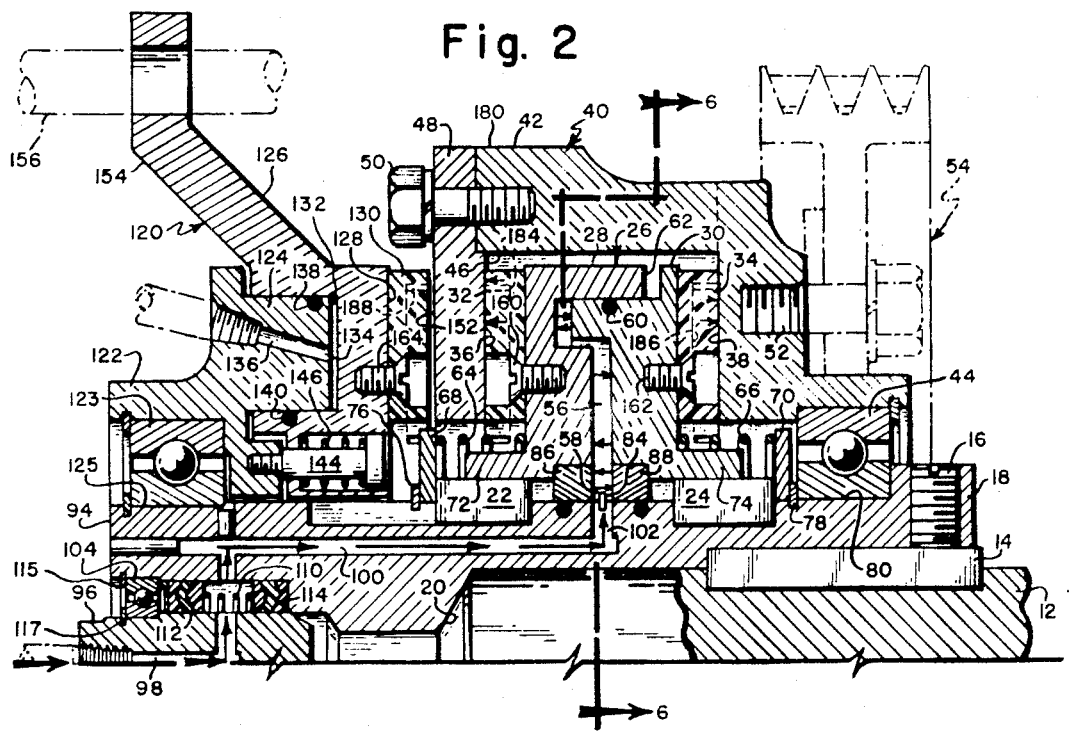

Sept. 23, 1969  F. P. EDWARDS  3,468,402
CLUTCH AND BRAKE
Filed April 4, 1968  6 Sheets-Sheet

INVENTOR
FRANCIS P. EDWARDS

ATTORNEY

Sept. 23, 1969    F. P. EDWARDS    3,468,402
CLUTCH AND BRAKE
Filed April 4, 1968    6 Sheets-Sheet 4

INVENTOR.
FRANCIS P. EDWARDS

ATTORNEY

Sept. 23, 1969  F. P. EDWARDS  3,468,402
CLUTCH AND BRAKE
Filed April 4, 1968  6 Sheets-Sheet 5

FRANCIS P. EDWARDS

John Cyril Malloy
ATTORNEY

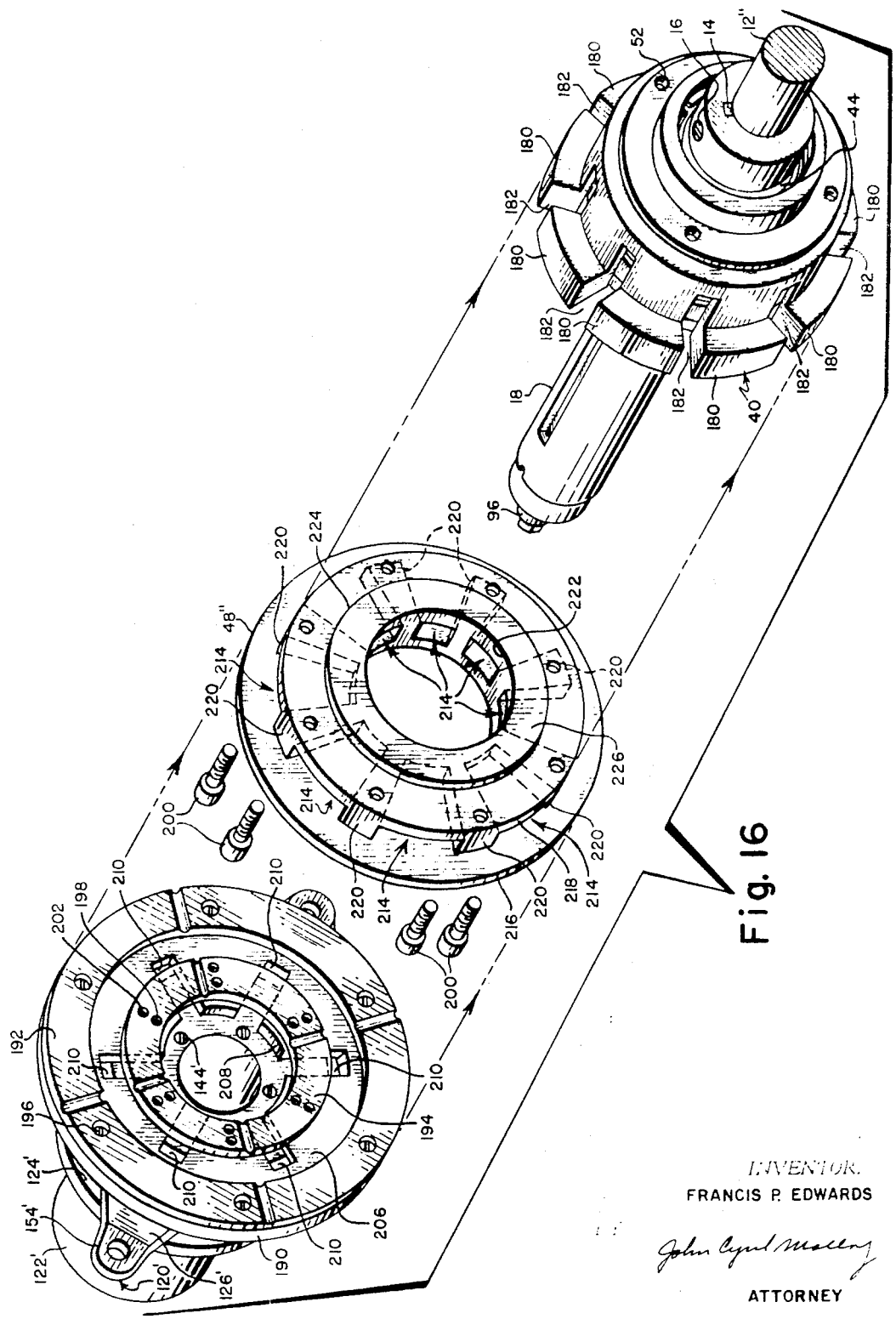

United States Patent Office 3,468,402
Patented Sept. 23, 1969

3,468,402
CLUTCH AND BRAKE
Francis P. Edwards, 7345 SW. 19th Street Road,
Miami, Fla. 33155
Filed Apr. 4, 1968, Ser. No. 718,705
Int. Cl. F16d 11/06, 13/16
U.S. Cl. 192—18     10 Claims

ABSTRACT OF THE DISCLOSURE

A clutch on a rotating shaft to selectively drive a secondary mechanism; the clutch includes axially moveable members on the shaft arranged to expand into engagement with a rotatable cage circumposed about the axially moveable members to rotate the cage and in so doing transmit motion thereto; additionally, brake means are provided to engage the cage to quickly stop it and the transmission of power on disengagement of the clutch.

---

This invention relates to a clutch mechanism and more particularly to a clutch mechanism which includes axially moveable members on a rotating shaft which are adapted to be moved axially to engage a rotatable clutch member of open work cage form to drive the same, and which also includes a brake mechanism.

Generally, in order to carry out the aforesaid clutching purpose, a shaft is provided which is rotating at all pertinent times. Keyed for rotation with the shaft, mating, axially expandable clutch members are provided and adapted to be separated by movement in opposite directions. These clutch members interconnect in male and female relation defining an operating chamber or gap therebetween which is sealed. The clutch members are held in this operating chamber defining position by spring means and limit means so that, through an entrance passageway leading to the chamber, a fluid pressure may be induced to expand the clutch members separating them in an axial movement which brings them into clutching engagement with an axially fixed, freely rotatable member. The latter member is of cage form and is arranged about the clutch members so that it is against the confronting surfaces of the cage that the clutch members expand so that friction disks or rings carried on the clutch member engage the cage and cause it to rotate, and, consequently, to transmit rotation from the shaft to the cage. Suitable pulley means are arranged in connection with the cage for driving purposes.

The braking mechanism comprises a reference ring which is mounted in a predetermined position about the shaft and with respect to which there is an axially slidable and mating member sized and configured to define a closed air chamber therebetween. On the interjection of air pressure this latter member is adapted to move axially to cause a friction disk to be brought into braking engagement with the cage to stop the same when it is moving freely and is not in engagement with the clutch members.

Means are provided for cooling the clutch and brake mechanisms. Because the cage is of an open-work construction it acts as a blower to induce air to flow over the surfaces which become heated in the clutching and braking action. Also, the friction disks are provided with passageways to permit and encourage the flow of air introduced by reason of the aforesaid blower type action, and, additionally, structure is described hereinafter which specifically promotes a cooling air flow throughout the mechanism to cool the surfaces of engagement.

It is, therefore, an object of this invention to provide an improved clutch mechanism to be keyed for rotation on a rotating shaft, which clutch includes axially movable mating clutch members with a sealed pocket therebetween into which fluid pressure is adapted to be introduced to expand the members into clutching engagement with a member journalled for free rotation on the shaft to transmit forces of rotation to the latter for selectively transmitting power to a secondary machine.

It is another object of this invention to provide, for a clutch mechanism of the type described in the preceding paragraph, an improved braking mechanism which includes an axially fixed member and an axially movable but angularly fixed member which are intermated in male and female relation with a pocket defined therebetween so that on the introduction of fluid pressure into the pocket the axially movable member is adapted to be moved axially into and out of braking engagement with the clutch member caused to rotate by the above-described clutching action.

It is another object of this invention to provide a clutch mechanism and a brake mechanism which are each characterized by a structure adapted to operate in response to fluid pressures and which include slots and grooves so that cooling air is pumped over and around the surfaces which engage in the clutching and braking action.

It is another object of this invention to provide an improved heavy duty brake mechanism for use on a clutch mechanism of the type described hereinafter, which heavy duty brake mechanism is characterized by an adapter ring having slots and grooves arranged to promote a flow of cooling air around the frictionally engaging surfaces of the braking mechanism.

It is a general object of this invention to provide an improved clutch mechanism for use on a rotating shaft to selectively transmit power therefrom to a secondary machine which is simple in construction, inexpensive to manufacture, which may be used either for relatively light loads or relatively heavy loads, and which is simple to install and operable to achieve the purposes more fully set forth hereinafter.

In accordance with these and other objects which will become apparent hereinafter, the instant invention will now be described with reference to the accompanying drawings in which:

FIGURE 2 is a partial elevation view in cross section of the upper portion of FIGURE 1 and illustrating the clutch members in an extended or clutch engaged position;

FIGURE 3 is a view similar to FIGURE 2 and showing the brake engaged and with the clutch members in a disengaged position;

FIGURE 16 is an exploded, perspective view of the elements of the heavy duty brake modification and which elements are included in the embodiment shown in FIGURES 12 through 15.

STRUCTURE OF THE CLUTCH MECHANISM

Figure 1:
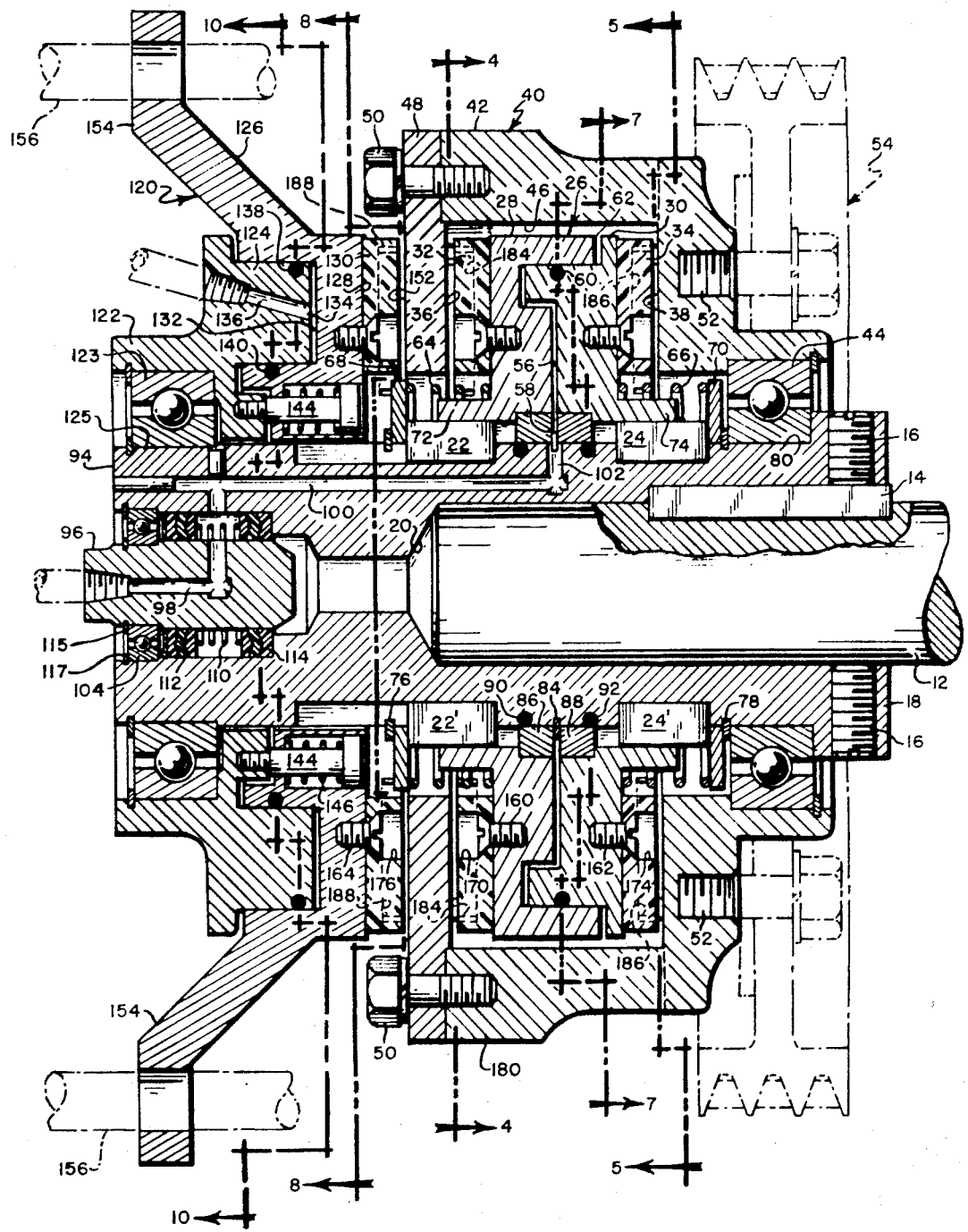
FIGURE 1 is an elevation view in cross section illustrating the clutch and brake mechanism of the instant invention in a disengaged position.
Figure 8:
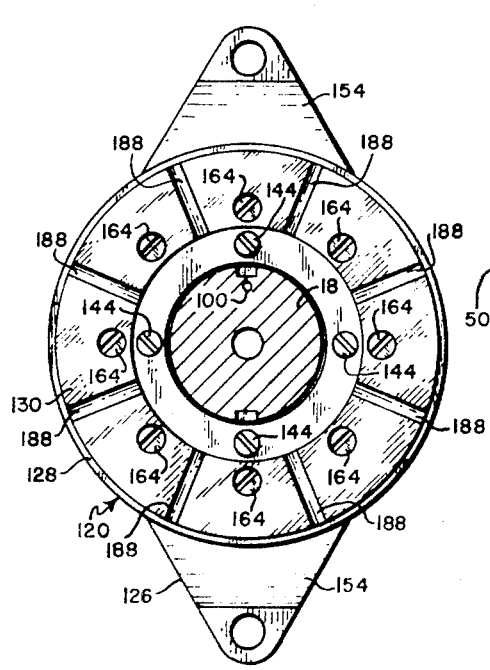
FIGURE 8 is a view in cross section taken along the planes indicated by the line 8—8 of FIGURE 1 and looking in the direction of the arrows.
Figure 9:
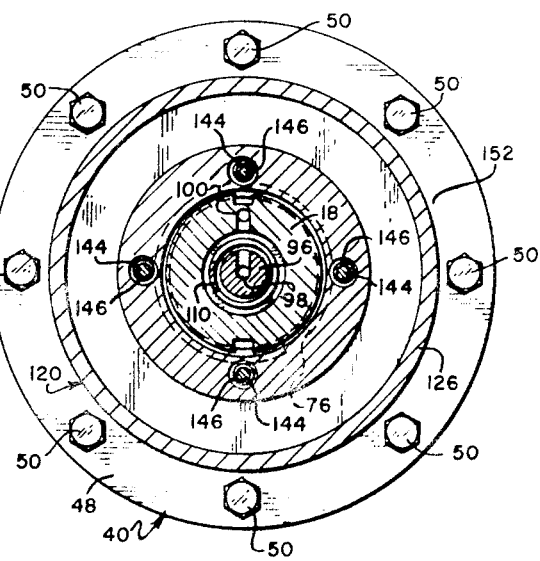
FIGURE 9 is a cross sectional view of the device illustrated in FIGURE 3 taken in the plane indicated by the line 9—9 in FIGURE 3.

Referring to the drawings wherein like reference characters designate like or corresponding parts throughout the different views, and referring particularly to FIGURE 1, the numeral 12 generally designates a shaft which, for purposes of this description will be considered as continuously rotating to provide a source of power. Connected to the shaft 12 by key means 14 and set screws 16, a spindle sleeve is provided, the said sleeve 18 being configured so as to snugly jacket the end 20 of the shaft 12. Keyed as by the key means, such as 22 and 22' and 24 and 24', arranged on the periphery of the sleeve 18, a clutch generally designated by the numeral 26 is provided. The clutch is composed of a first and a second axially moveable member, one a female member 28 and the other a male clutch plate member 30. As will be described more fully hereinafter these clutch members are adapted to expand axially outwardly to bring their respective associated friction disks 32 and 34 on the female and male clutch members respectively into clutching engagement with surfaces 36 and 38 respectively on a cage 40 which is to be rotated thereby.

Figure 4:
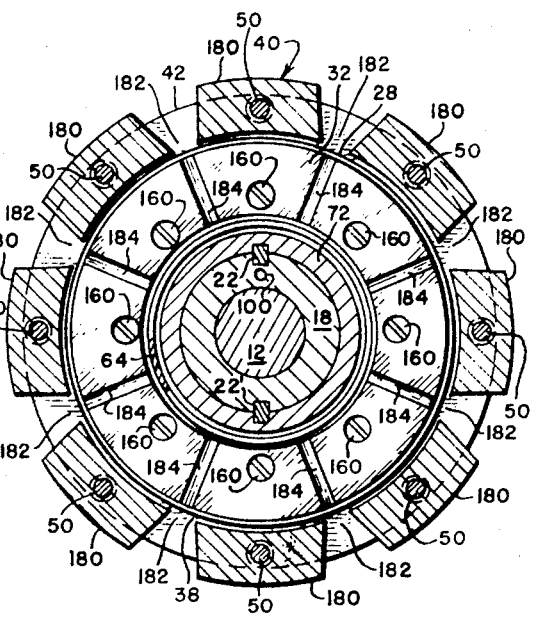
FIGURE 4 is a view in cross section taken along the plane indicated by the line 4—4 of FIGURE 1 and looking in the direction of the arrows.

The cage comprises an openwork, composed of an interconnected hub 42 and close off plate 48, as will be apparent, for instance, on reference to FIGURE 4. The hub 42 is axially fixed and rotatably supported on bearing 44, so as to be free to rotate under the influence of contact with the axially expandable clutch members. The hub is recessed and defines an operating chamber 46 within which the clutch members are axially movable by expansion means as will be described hereinafter, the close off plate 48 being suitably secured to the hub by means of screws, such as that indicated by the numeral 50. A member to be rotated by the clutch mechanism is indicated by the dotted lines in FIGURES 1, 2 and 3 indicated by the numeral 54; the screw recesses 52 may be used to connect such a member to the cage for rotation with it when it rotates. It will be understood that, although a pulley wheel is indicated by the numeral 54, numerous other types of power takeoff devices may be used, such as a sprocket wheel for a chain or the like. It will be noted that for purposes of balance the center line of the forcelines caused by the load transmitting or driven member 54 is disposed over the bearing to provide balance.

Referring now to the clutch 26 the constituent male and female members of which are disposed in the annular operating chamber 46, it will be seen that there is an annular gap 56 between these members and that these members are companionately sized so that this gap 56 is at all times closed except for a radial by facing entrance port 58. To maintain the gap in a fluid tight condition, for a purpose which will become apparent, an O-ring 60 is provided on the mating peripheral surfaces of the male and female clutch members. Further, a clearance distance is provided, such as the relief on the leading edge 62 of the rim of the female member for clearance to accommodate limited axial movement of the clutch members 28 and 30 from a normal position. The clutch members 28 and 30 are held in a normal position by spring means 64 and 66 which respectively bear against the associated clutch member and retaining rings 68 and 70 fixed in an axial position and rotatable with the spindle 18. To this end each of the clutch members is provided with an axially extending flange 72 and 74 on which the springs dwell as they apply a pressure to hold the clutch members in the disengaged position shown in FIGURE 1. The rings 68 and 70 are locked against the spring pressure by means of snap rings 76 and 78. It will also be seen that the latter snap ring 78 provides one side of a seat 80 in which the bearing 44 dwells.

It will be helpful to point out that by reason of this structure the clutch members rotate with the shaft and are expandable axially in the operating chamber, in response to an increase of pressure in the gap 56, so as to engage the cage and cause it to turn for transmitting power.

Figure 6:
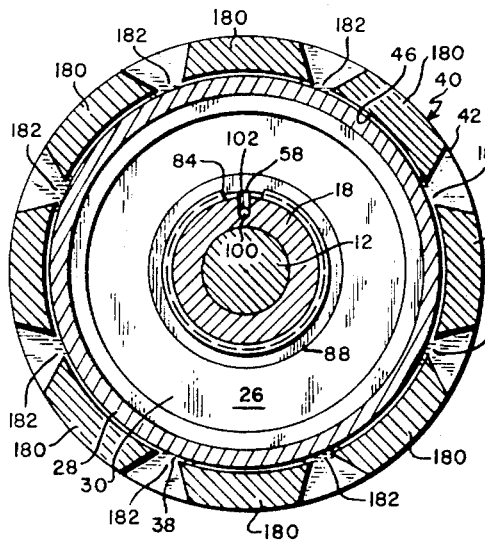
FIGURE 6 is a cross sectional view of the device as illustrated in FIGURE 2 and taken on the plane indicated by the line 6—6 in FIGURE 2.
Figure 5:
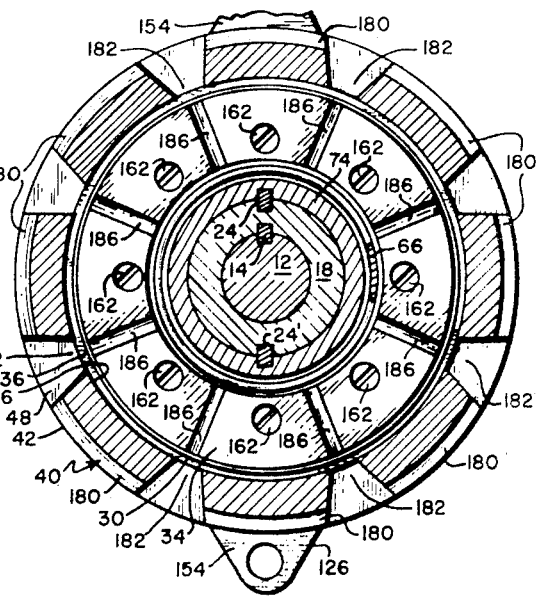
FIGURE 5 is an elevation view taken along the plane indicated by the line 5—5 of FIGURE 1 and looking in the direction of the arrows.
Figure 7:
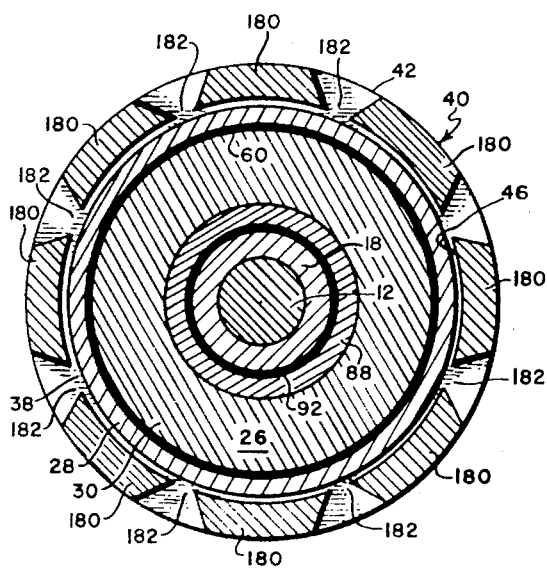
FIGURE 7 is an elevation view in cross section taken along the planes indicated by the line 7—7 of FIGURE 1 and looking in the direction of the arrows.
Figure 10:
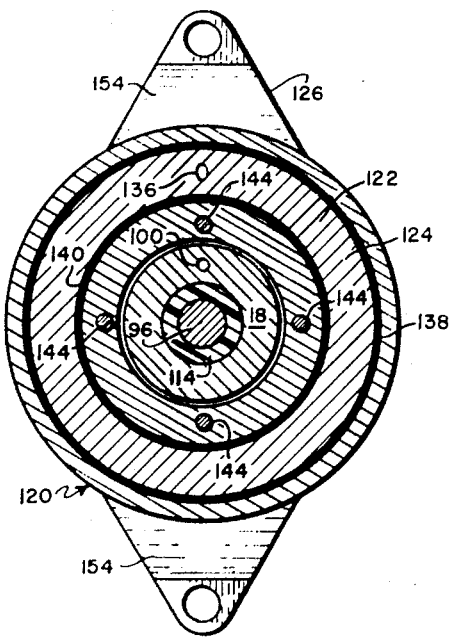
FIGURE 10 is a view taken along the planes indicated by the line 10—10 of FIGURE 1 and looking in the direction of the arrows.

It will be noted that there is provided in the medial plane between the clutch members a spacer or snap-ring, which is designated by the numeral 84 in FIGURE 2 as well as in FIGURE 6 and which is confined between wear rings, preferably of brass, one on either side of the ring 84, the said wear rings being designated by the numerals 86 and 88 respectively. To maintain the fluid tight integrity of the gap with the exception of the aforesaid entrance port 58, O-rings 90 and 92 are provided in the sleeve 18 and bear against the inner diameter of the wear rings 86 and 88.

OPERATION OF THE CLUTCH MECHANISM

It will be seen that by reason of this structure, a change in pressure confined within the gap 56 will expand the clutch members 28 and 30 in opposite axial directions storing energy in the associated springs of each clutch member, thus bringing the friction disks 32 and 34 into clutching engagement with the confronting surfaces 36 and 38 of the cage to cause the same to rotate, thereby transmitting forces of rotation from the continuously driven shaft 12 to the cage 40 and the connected power output member 54.

OPERATING FLUID FLOW PATH

The means for selectively introducing a fluid pressure into the gap 56 to move the clutch members apart axially will now be described.

Referring to the left of FIGURE 1, it will be seen that in the end 94 of the spindle sleeve 18, an axial recess is provided in which a fitting 96 is mounted on bearing 104 to provide for relative rotation of the spindle sleeve while the fitting remains fixed. The fitting provides a passageway 98 which is arranged in open communication with an axially extending bore 100 in the spindle sleeve 18 which communicates through a connecting vertical bore 102 with the aforesaid port 58 and the gap 56. It will be seen that upon the introduction of a fluid pressure, either hydraulic or gaseous, through the passageway 98 of the fitting 96 there will be introduced pressure forces to expand the clutch members into clutching engagement with the cage as can be seen in FIGURE 2.

Suitable means are provided to seal the pressure transmittal path and to hold the fitting; for instance, as shown, bearing 104 includes a spring 110 captivated between packing glands 112 and 114 and held by retaining ring 115 locked in the groove 117.

CLUTCH MECHANISM OF FIGURE 11

Figure 11:
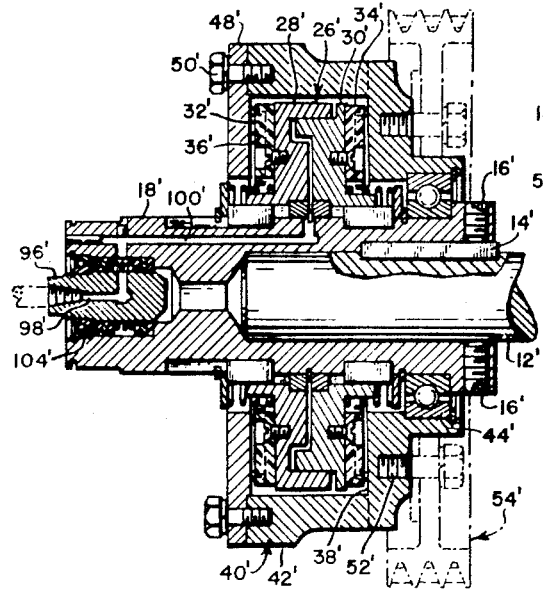
FIGURE 11 is a modified view of the clutch mechanism which is the same as seen in FIGURE 1; however, it is here shown and illustrated independently of the brake mechanism.

Briefly, with respect to the alternative or modified embodiment of FIGURE 11, which is of the clutch mechanism only, and does not include the brake now to be described, it will be noted that the same structure as that described above is there illustrated. To simplify this specification, the parts seen in FIGURE 11 have been designated by similar numerals to that utilized in the aforesaid description with the exception that prime designations have been utilized, and extended discussion of the structure is omitted.

STRUCTURE OF THE BRAKING MECHANISM

Turning now to the braking mechanism, it is provided to stop the cage from rotating. In FIGURE 1, the braking mechanism is designated by the numeral 120. This braking mechanism is composed of an axially fixed outermost reference ring 122 which includes an axially projecting male portion 124 for snug receipt in an axially moveable female member 126 in a fashion similar to that of the previously described relation of the mating clutch members. Also, the surface 128 of the moveable member 126 which confronts the cage, is provided with a brake disk 130. Also, in a manner somewhat similar to that in which the gap is maintained in a closed position with respect to the clutch members, the male and female members of the brake 120 define a gap 132 therebetween which has a single generally axial facing entrance port 134 which in turn is in open communication with a passageway 136 in the mouth of which a fitting is adapted to be received. This gap is sealed by O-rings 138 on the outer confronting surfaces of the brake members and 140 on the inner surfaces of the brake members. The female member of the brake mechanism is maintained in gap defining normal relation with respect to the male member; to effectuate this the spring biased bolts 144 are provided so that a spring 146 coiled therearound will hold the brake members in a predetermined relation, yieldable for expansion to carry the brake disk 130 into braking engagement with the cage to stop it from turning or transmitting power to the member 54.

OPERATION OF THE BRAKING MECHANISM

The operation of the braking mechanism will be apparent on reference to FIGURE 3. It is intended to be operated only when the clutch is not engaged and while the cage is rotating freely and it is desired to stop it positively and quickly within a short period of time. As is indicated by the arrowed line 150, air is introduced through the entrance mouth of the passage 136 and into the gap through the port 134 which causes a relative movement axially of the female brake member carrying the friction disk 130 into the braking engagement shown with the confronting surface 152 of the cage. It will be noted that in order to resist the tendency for the brake mechanism to turn as the friction disk of the braking mechanism is brought into braking engagement, it is held in a fixed angular position with respect to the center line of the shaft, while at the same time being axially moveable to accommodate the braking action. The fixed angular position is maintained by radially extending arms 154 having holes through which rigid fixed locater rods indicated by the phantom lines 156 are passed to simultaneously hold the angular position thereof and permit relative sliding adjustment in response to the introduction of fluid pressure in the gap as indicated by the arrowed line 150.

It will be apparent that suitable friction disk mounting screws 160, 162 and 164 are provided to connect the associated friction disks with the male and female clutch members and the female brake member respectively. Each of these mounting screws is receivable in a tapped hole in the member 126 with which it is carried and the brake disk is recessed as at 176 so as to prevent wear and gouging of the surface 152 against which the friction disk bears.

CONTROL MEANS

On reference to FIGURE 3, it is seen that there is designated at about the center line, an axial distance D which measures a space between the inboard end of the keys 22 and 22' and the adjacent wear ring 86 and also, the space between the keys 24 and 24' and the ring 88. It will also be seen that this distance D is related to the depth of the counterbores 170 and 174 in the respective friction disks of the respective clutch members in such a manner that the distance D is at all times less than the depth of the recess or counterbores 170 and 174 when a screw such as 160 and 162 is seated therein. This constitutes a limit means to limit the axial movement permissible on expansion of the clutch members so that the head of the screw will not gouge and wear against the confronting surfaces of the cage. Referring to the distance designated C in FIGURE 3, the same type of relation exists with respect to the depth of the seat 176 to limit the travel of the brake member to abutment with ring 76.

COOLING MEANS STRUCTURE

Cooling means are provided to dissipate the heat generated by the device. With reference to FIGURE 4, it will be seen that in the preferred embodiment the hub of the cage is provided with axially extending slots so as to define the aforesaid openwork type cage around the operating chamber 46. The slots are defined between the inclined walls of axially extending spokes such as that designated by the numeral 180, with the result that while the cage is rotating, there is a drawing action to entrain air and cause it to circulate through and around the exterior of the clutch members. To encourage this air flow, through the operating recess, and encourage more air to flow into the openings 182 of the cage, the faces of the friction disk are radially grooved as can be seen in FIGURE 4, the grooves being designated by the numeral 184 and 186 in the respective disks of the clutch members. This has been found to provide a definite cooling tendency which is highly desirable for dissipating the heat, especially on the cover plate 48. Because of this desired cooling flow, in the preferred embodiment the friction disk 130 of the brake mechanism is also provided with radially extending grooves 188 in the operating face thereof to promote flow of cooling air.

HEAVY DUTY BRAKE STRUCTURE EMBODIMENT

As an alternative embodiment, a heavy duty brake structure is provided. Referring now to the embodiment of FIGURES 12 through 16, and especially to the view of FIGURE 15, there is provided structure such as to permit of and encourage an increased flow-through amount of cooling air along a path around the portions of the device to which the friction producing members are mounted and against which the same engage in a braking action. This embodiment is useful when heavy brake loads are encountered. First, to simplify the specification, the parts common to the other embodiments have been designated by similar numerals to that used above and are not referred to except where desirable to explain in detail. Structure-wise it will be seen on reference to FIGURE 12, that intermediate the close-off plate 48" of the rotatable cage and the axially moveable member 126' of the brake mechanism, there is provided an adapter or ring carrier 190. Referring now to FIGURE 16, it is seen that in this embodiment, the close off plate 48" and the adapter or carrier 190 are diametrically enlarged and slotted as will be explained hereinafter to define a flow-through path as indicated by the arrowed lines in FIGURE 12 for air when the brake is applied. The braking surface is composed of an outer brake ring 192 and an inner brake ring 194 fastened to the carrier as by the screws 196 and 198 and defining therebetween an annular space 206. As seen in FIGURE 13, it will be seen that the close off plate 48" is connected to the cage hub by means of the screw 200; and that the carrier 190 is connected to the axially moveable member 126' by the screws 202.

Figure 12:
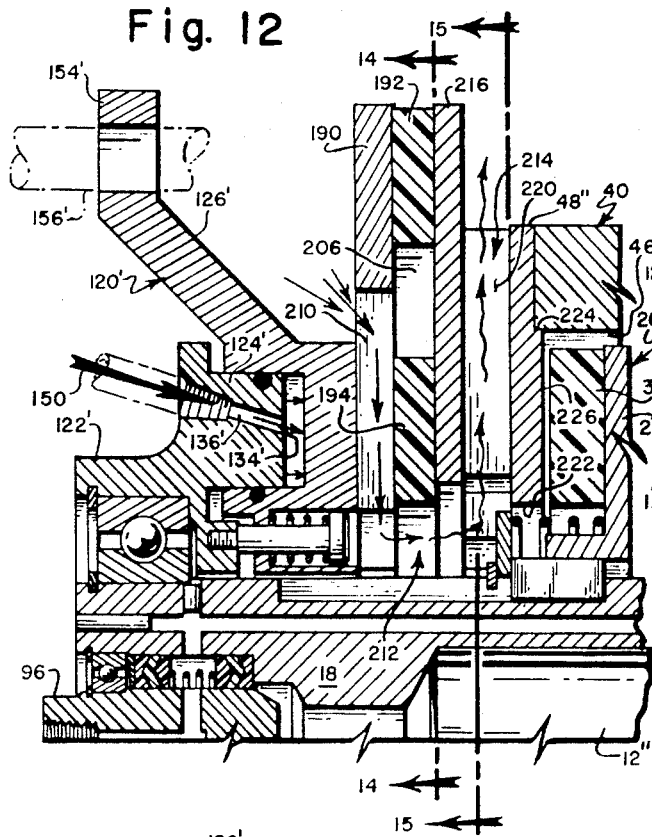
FIGURE 12 is a partial view in cross section illustrating a modified braking mechanism for the clutch when used on a heavy duty installation, the said view being similar to the related aforesaid views numbered 2 and 3.
Figure 13:
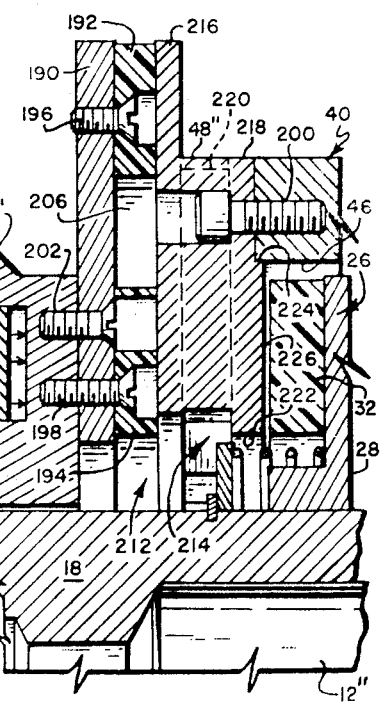
FIGURE 13 is a partial view of the central portion of FIGURE 12 taken on selected planes to illustrate the positioning of the mounting screws there shown in relation to the parts to which they are assembled.
Figure 14:
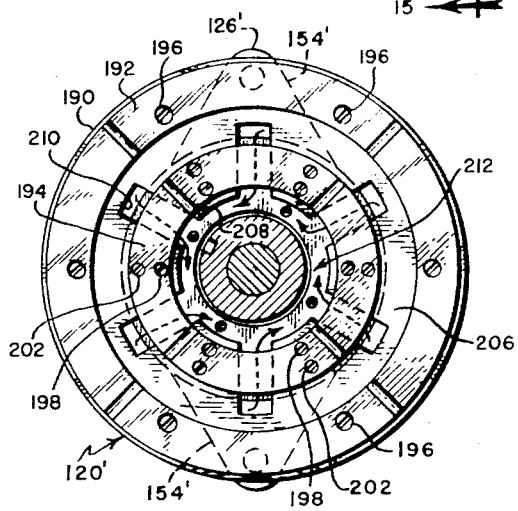
FIGURE 14 is a view in elevation taken along the plane indicated by the line 14—14 of FIGURE 12.
Figure 15:
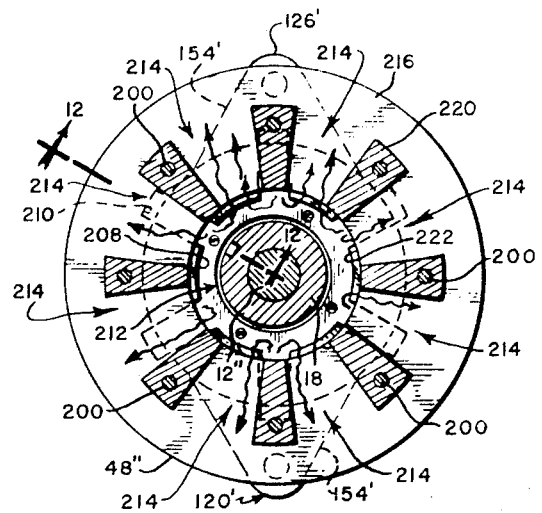
FIGURE 15 is a view in elevation taken on the plane indicated by the line 15—15 of FIGURE 12 and looking in the direction of the arrows.

The structure which results is seen in FIGURE 16; and the views shown in FIGURES 14 and 15 in combination with the indicated arrowed flow-through path seen in FIGURE 12 will be of assistance in understanding the structure of carrier 190 and the close-off plate 48" respectively. First, with reference to FIGURE 16 and also FIGURE 14 and with regard to the carrier 190, it is seen that it is provided with an enlarged central bore 208 and radial slots which extend toward but not to the outer circumference; thus, cooling slots or gaps 210 are defined in spaced relation around the bore wall 208. It will be seen that by reason of the annular configuration of the inner brake member or friction pad 194, the flow-through path extends axially through the space designated by the numeral 212 in FIGURE 12 to the close-off plate 48", which as seen in FIGURE 16 is of open work structure for cooling. Specifically, as can be seen in FIGURE 16, it will be seen that this path extends through the close-off plate 48" which is provided with radially extending slots 214 between the enlarged flange portion 216 and lower or cage side portion 218, with the axially extending lugs 220 connecting these portions.

It will be seen that the cage side surface 226 of the cage side portion 218 of close-off plate 48" is stepped to define the shoulder 224 circumposed about the engagement surface 226, the shoulder acting in assembly as a pilot to engage with the cage 40.

It will be seen that by reason of this modified version of FIGURES 12 through 16 there is provided a pumping action which causes air to flow through and around the braking surfaces, as explained above and indicated by the arrowed line in FIGURE 12, and this permits of a more rapid dissipation of the heat forces caused by the braking friction when the clutch brake mechanism is employed in heavy duty operations.

While the instant invention has been shown and described hereien in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. For use to transmit power from a rotating driving shaft to a secondary driven machine, a mechanism comprising:

a spindle sleeve keyed on the end of the rotating shaft and having, (a) a first axial bore in one end with the end of the shaft received therein, (b) a second axial bore in the other extending end of the spindle sleeve, and (c) a through passageway in the spindle sleeve wall communicating between said bore and a mouth on the surface of said spindle sleeve;

a pair of clutch members comprising a mating male and female member each keyed to rotate with the sleeve in close, axially movable, telescoping relation, with the terminal face of the male member at all times in but not touching the axial face of an annular recess in the female member of said pair, defining an annular operating chamber therebetween, said members being arranged on said sleeve with said operating chamber in open communication with the mouth of said passageway in the spindle sleeve, and said pair having oppositely, axially facing clutching surfaces;

a fitting in said second axial bore of said spindle sleeve having a through hole in open communication with the passageway in the spindle sleeve for fluid connection to a pressure source to communicate changes of pressure to said operating chamber;

first sealing means intermediate the mating clutch members and said spindle sleeve to maintain said operating chamber in fluid-tight relation;

second sealing means intermediate said fitting and said spindle sleeve to maintain the hole in the fitting in fluid-tight communication with said passageway;

means to yieldingly hold the clutch member pair in a normal axial position with said terminal face of the male member closely adjacent the confronting axial face in the recess of the female member, and yieldable in response to an increase of pressure in said operating chamber of sufficient degree to overcome said means to hold and effective to store energy for restoration of the clutch members to the normal position;

means to limit said axial movement on separation of the clutch members in opposite directions to a maximum enlargement of the operating chamber to define a maximum, clutch stroke for the clutch members;

a cage journalled for rotation on said spindle;

means to fix the axial position of said cage on said spindle with the cage being in surrounding relation of said clutch members, and said cage having interior axial faces in confronting relation to the clutching surfaces of said pair, the axial distances of the spacing between the interior axial faces of the cage from the respective clutching surfaces of the clutch member pair being less than the maximum clutch engaging stroke so that on an increase in pressure in the operating chamber sufficient to overcome said means to hold, the clutch-engaging surfaces of the clutch member pair will engage the interior face of the cage to cause it to rotate together with the spindle sleeve; and said cage including means adapted for connection to said secondary machine.

2. The device as set forth in claim 1 wherein said clutching surfaces are each composed of a brake ring of a high coefficient of friction secured on said clutch members to frictionally engage the interior axial face of the cage when the operating chamber is expanded.

3. The device as set forth in claim 1 wherein said cage comprises an open work with peripheral slots therethrough to dissipate heat of friction on clutching engagement of the pair with the cage by circulating cooling air through said cage.

4. The device as set forth in claim 1 wherein brake means are provided to stop rotation of said cage when said clutch members are in the normal position, said brake means comprising an axially movable, angularly fixed, braking ring member journalled on the shaft for relative rotation of the shaft therein said ring being adjacent said cage and including a braking surface adapted to be moved axially into and out of friction-producing engagement with an exterior axial face of said cage.

5. The device as set forth in claim 4 wherein said brake means includes an axially fixed brake member and said brake member and ring are configured so as to define mating male and female members with the male portion at all times in said female portion and with the terminal end of the male portion at all times in but not touching the axial face of an annular recess in the female member defining a chamber therebetween, and a conductor hole to communicate fluid into said brake chamber to move the brake rig axially with respect to the axially fixed brake member into and out of braking engagement with said cage, said brake means including sealing means to maintain said chamber in fluid-tight relation.

6. The device as set forth in claim 5 wherein spring means are provided to normally hold the brake ring in a normal brake disengaged position.

7. The device as set forth in claim 6 wherein a ring of brake material is carried on said brake ring to engage said cage, and said brake material, radially slotted for air flow thereover.

8. The device as set forth in claim 6 wherein said brake ring and said cage are each provided with radially extending slots and axial slots interconnecting the radial slots so that when the brake ring is in engagement with the cage, a flow through path is defined around the surfaces of braking engagement between the cage and ring.

9. The device as set forth in claim 8 wherein the rings of brake material are of a high coefficient of friction and are secured on said clutching surfaces of said pair and on the braking surface of said brake ring, each of said rings of braking material having an axial thickness greater than that of the said maximum clutch-engaging stroke and said fixed member of said brake mechanism is axially fixed with respect to the brake ring such that the maximum expansion of the operating chamber between the brake ring and the brake member is of a maximum axial dimension substantially equal to the maximum stroke of said clutch members.

10. The device as set forth in claim 8 wherein an inner and an outer ring of brake material are carried on said brake ring, said rings being in concentric relation and radially spaced from one another.

References Cited

UNITED STATES PATENTS

| | | |
|---|---|---|
| 2,299,387 | 10/1942 | Groll. |
| 2,361,120 | 10/1944 | Peterson. |
| 2,422,159 | 6/1947 | Wood. |
| 3,353,638 | 11/1967 | Smoll. |

FOREIGN PATENTS

| | | |
|---|---|---|
| 179,320 | 5/1962 | Sweden. |

BENJAMIN W. WYCHE III, Primary Examiner

U.S. Cl. X.R.

192—85, 113